(12) United States Patent
Leppin et al.

(10) Patent No.: US 9,050,557 B1
(45) Date of Patent: Jun. 9, 2015

(54) SCAVENGING AND TAILGAS PROCESS

(71) Applicants: Dennis Leppin, Chicago, IL (US); Ajay Makkuni, Hoffman Estates, IL (US); Timothy Tamale, Chicago, IL (US)

(72) Inventors: Dennis Leppin, Chicago, IL (US); Ajay Makkuni, Hoffman Estates, IL (US); Timothy Tamale, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 14/291,911

(22) Filed: May 30, 2014

(51) Int. Cl.
C01B 17/04 (2006.01)
C01B 17/05 (2006.01)
C10L 3/10 (2006.01)
B01D 53/52 (2006.01)

(52) U.S. Cl.
CPC .................. B01D 53/52 (2013.01); C10L 3/103 (2013.01)

(58) Field of Classification Search
CPC ........... C01B 17/04; C01B 17/05; C10L 3/10; C10L 3/103; B01D 53/52

USPC .................................... 423/575, 576.7, 574.1
See application file for complete search history.

(56) References Cited

U.S. PATENT DOCUMENTS 3,822,341 A * 7/1974 Smith ........................ 423/574.1
4,240,923 A * 12/1980 Sartori et al. ................. 252/189
6,203,599 B1 * 3/2001 Schubert et al. ............... 95/172

* cited by examiner

Primary Examiner — Timothy Vanoy
(74) Attorney, Agent, or Firm — Pauley Petersen & Erickson

(57) ABSTRACT

A process for removing sulfur dioxide from a hydrogen sulfide-containing gas utilizes a bubble tower and overcomes process control difficulties associated with known processes. Solvent is fed to the bubble tower, loaded with sulfur dioxide and maintained at desired temperature and pressure. Hydrogen sulfide-containing gas is bubbled through the solvent, causing chemical reaction between the sulfur dioxide and hydrogen sulfide to yield water and elemental sulfur. Elemental sulfur is collected and ultimately discharged from the bottom of the bubble tower, and hydrogen sulfide-depleted gas is discharged from the top.

22 Claims, 1 Drawing Sheet

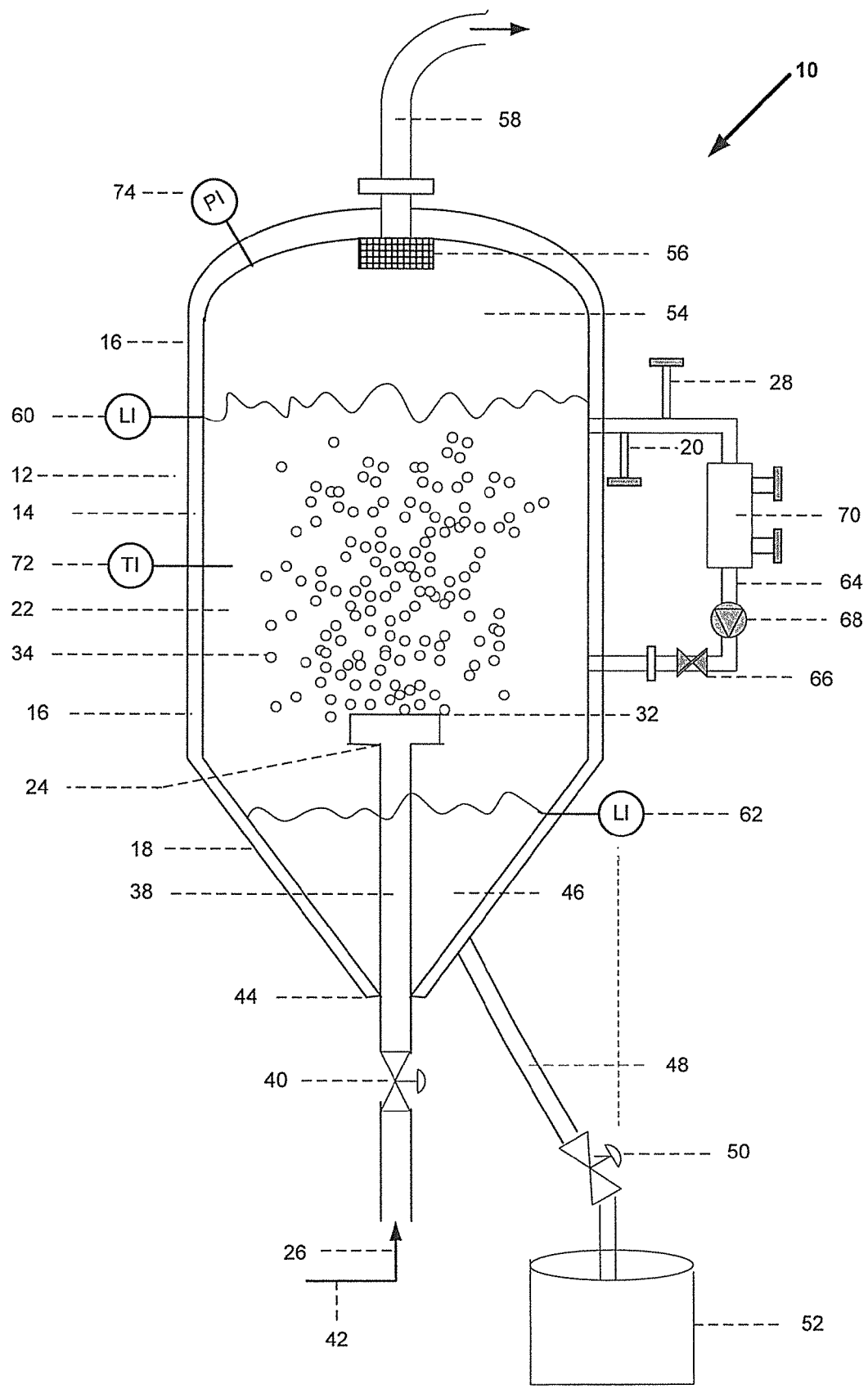

SCAVENGING AND TAILGAS PROCESS

FIELD OF THE INVENTION

This invention is directed to a process for removing sulfur from hydrogen sulfide-containing gas.

BACKGROUND OF THE INVENTION

Hydrogen sulfide gas is both a contaminant and a pollutant found in natural gas and various industrial gases. In order to prevent emission of hydrogen sulfide gas, which carries the foul odor of rotten eggs and is poisonous, corrosive and flammable, various processes have been developed. Some processes react hydrogen sulfide with sulfur dioxide to yield elemental sulfur (which can be recovered) and water, according to the following reaction:

$$2H_2S + SO_2 \rightarrow 2H_2O + 3S$$

The sulfur dioxide can be produced by the combustion of sulfur, suitably including sulfur that is generated in the reaction of hydrogen sulfide with sulfur dioxide. The end result can be a treated natural gas or treated industrial gas emission that is substantially free of both hydrogen sulfide and sulfur dioxide.

U.S. Pat. No. 7,381,393, issued to Lynn, discloses a process for removing hydrogen sulfide (and thus sulfur) from a gas by reaction in an organic liquid medium, under heat, with sulfur dioxide. The disclosed process includes the steps of reacting a hydrogen sulfide-containing gas stream with a stoichiometric excess of sulfur dioxide in a reactor to produce a sulfur dioxide-containing gas and liquid sulfur, using a higher boiling point organic liquid medium and a temperature exceeding the melting point of sulfur; withdrawing liquid sulfur from the reactor; withdrawing the sulfur dioxide-containing gas from the reactor; removing the sulfur dioxide from the gas; and recycling the sulfur dioxide for use in the first step of the process.

U.S. Pat. No. 5,928,620, issued to Lynn, discloses an earlier process for removing elemental sulfur from a hydrogen sulfide-containing gas. The process includes the steps of passing the hydrogen sulfide-containing gas through a hydrogen sulfide absorber to obtain a gas having a diminished amount of hydrogen sulfide, stripping the hydrogen sulfide out of the resulting hydrogen sulfide-rich solution to obtain a hydrogen sulfide-rich gas, feeding the hydrogen sulfide-rich gas and sulfur dioxide into a reactor, reacting the hydrogen sulfide and sulfur dioxide to convert about 50% of the hydrogen sulfide to sulfur dioxide and water, combusting the remaining hydrogen sulfide to yield sulfur dioxide, and feeding the sulfur dioxide back into the reactor.

The foregoing processes require continuous and precise monitoring of hydrogen sulfide and sulfur dioxide flow rates to ensure continuous and efficient operation. Any significant deviations or measurement errors can result in unwanted emission of the excess component, whether hydrogen sulfide or sulfur dioxide, that exceeds specifications. This can be very difficult when the objective is to reduce the hydrogen sulfide and sulfur dioxide content in the gas to a few ppmv. Moreover, the scavenger tanks used in these processes must be drained, cleaned and re-charged with fresh solvent on a periodic basis. There is a need or desire for a process for removing sulfur from a hydrogen sulfide-containing gas which addresses these difficulties.

SUMMARY OF THE INVENTION

The present invention is directed to a process for removing sulfur from a hydrogen sulfide-containing gas. In one embodiment, the process includes the step of providing a bubble tower including an upright vessel having an upper main body portion, a lower portion, a solvent feed nozzle for feeding liquid solvent to the upper main body portion, and a sparger for feeding gas below the solvent feed nozzle. The process further includes the steps of injecting liquid solvent into the bubble tower through the solvent feed nozzle; injecting sulfur dioxide into the liquid solvent; injecting hydrogen sulfide-containing gas into the bubble tower through the sparger; bubbling the hydrogen sulfide-containing gas through the liquid solvent in the bubble tower; and chemically reacting the hydrogen sulfide with the sulfur dioxide in the liquid solvent to yield elemental sulfur and water.

Any excess sulfur dioxide can remain in the vessel, and additional sulfur dioxide can be added to the bubble tower as needed to ensure a substantially complete depletion of the hydrogen sulfide. So long as enough or more than enough sulfur dioxide is maintained to keep any emission of hydrogen sulfide within the very low permissible emission levels, there is no need to continuously analyze the solution in the bubble tank. Injecting a known amount of sulfur dioxide within the capacity of the system to absorb such amount can be performed whenever the hydrogen sulfide in the exit gas exceeds a predetermined level approaching the maximum allowable level of hydrogen sulfide. This is a much simpler control scheme compared to precisely feeding a stoichiometric amount of sulfur dioxide based on the amount of hydrogen sulfide in the incoming stream. Hydrogen sulfide emissions need to be monitored, as is the case with known processes. The difficulties associated with precise process control of known processes are substantially eliminated.

With the foregoing in mind, it is a feature and advantage of the invention to provide an efficient process for removing sulfur from hydrogen sulfide-containing gas that substantially eliminates the process control challenges associated with known processes. This and other features and advantages will become further apparent from the following detailed description of the invention, read in conjunction of the drawing.

BRIEF DESCRIPTION OF THE DRAWINGS

FIG. 1 schematically illustrates a bubble tower process of the invention for removing sulfur from a hydrogen sulfide-containing gas.

DETAILED DESCRIPTION OF THE INVENTION

Referring to FIG. 1, a process 10 of the invention for removing sulfur from a hydrogen sulfide-containing gas is illustrated. The process 10 includes a bubble tower 12 including an upright vessel 14 having an upper main body portion 16, a lower portion 18, a solvent feed nozzle 20 for feeding liquid solvent 22 to the upper main body portion, and a sparger 24 for injecting hydrogen sulfide-containing gas 26 into the bubble tower 12. The upper main body portion 16 is suitably cylindrical in cross-section, and the lower portion 18 is suitably conical to facilitate the removal of elemental sulfur.

A separate feed nozzle 28 is provided for injecting sulfur dioxide into the incoming stream of liquid solvent 22. Alternatively, the sulfur dioxide can be injected directly into the vessel 14 of the bubble tower 12. The solvent 22 can be organic, or a mixture of mainly organic and inorganic solvents. One suitable organic solvent is diethylene glycol methyl ether ("DGM"), which exhibits good solubility for sulfur dioxide, hydrogen sulfide, and the typically homogenous catalysts that can facilitate the chemical reaction between sulfur dioxide and hydrogen sulfide, and exhibits low solubility for liquid sulfur. Other suitable organic solvents include without limitation triethylene glycol methyl ether, triethylene glycol dimethyl ether, polyethylene glycol dimethyl ether, and other polyglycol ethers. The solvent should have a boiling point well above the desired reaction temperature of about 110-150° C. to enable operation of the bubble tower 12 at or above atmospheric pressure. Mixtures of mainly organic solvent (e.g. DMG) and inorganic solvent can also be employed, provided that the capacity for atmospheric or low pressure operation is maintained without substantially vaporizing the solvent. The vapor pressure of the solvent should be substantially less than the typical maximum operating pressure of about 70 atmospheres absolute, so that the solvent does not vaporize into the gas appreciably at the reaction temperature.

The sparger 24 can be T-shaped. The top 32 of the T can be equipped with multiple openings along its length for injecting the hydrogen sulfide-containing gas at multiple points along the cross-section of the vessel 14 of bubble tower 12, causing a substantially uniform distribution of bubbles 34 of hydrogen sulfide-containing gas. For an even better distribution of bubbles 34, the T-shaped sparger 14 can be equipped for rotation around its stem 38. The stem 38 of the T-shaped sparger 24 extends from a flow control valve 40 that regulates the flow of hydrogen sulfide-containing gas from a source 42, extends into the vessel 14 from the lower apex 44 of the conical lower portion 18, and extends far enough into the vessel 14 to engage the top 32 of the T-shaped sparger within the solvent 22.

Once the liquid solvent 22 is injected to a suitable height within the vessel 14, and is suitably loaded with sulfur dioxide, the hydrogen sulfide-containing gas 26 can be injected through the sparger 24 and bubbled through the liquid solvent 22 in a substantially uniform fashion, i.e., with a substantially uniform distribution of bubbles 34. The hydrogen sulfide then chemically reacts with the sulfur dioxide according to the standard equation, to yield water and elemental sulfur:

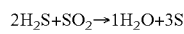

$$2H_2S + SO_2 \rightarrow 1H_2O + 3S$$

The elemental sulfur 46 is denser than the solvent 22 and collects in the lower conical portion 18 of the vessel 14, where it can be periodically recovered and emptied into a discharge container 52 via an exit line 48 leading from the lower conical portion 18 and regulated by a discharge valve 50. The liquid solvent 22 loaded with sulfur dioxide rests above the elemental sulfur 46 at a level high enough in the vessel 14 to ensure substantially complete reaction between the sulfur dioxide and hydrogen sulfide as the hydrogen sulfide-containing gas 26 is bubbled through the solvent medium. The hydrogen sulfide-containing gas 26 is stripped of its hydrogen sulfide and the resulting hydrogen sulfide-depleted gas 54 passes through a demister 56 to alleviate any condensation and exits through a stack 58. The water produced by the chemical reaction can be vaporized due to the heat in the vessel 14 (explained below) and can either exit through the stack 58 in vapor form, or can remain in the vessel 14 as part of the solvent 22.

The solvent 22 is suitably treated with a catalyst to facilitate the chemical reaction between the hydrogen sulfide and the sulfur dioxide. Suitable catalysts include tertiary amines, particularly lower alkyl substituted tertiary amines, lower alkyl and aryl substituted tertiary amines, and aryl substituted tertiary amines, including those where the amine nitrogen is an aromatic ring. Examples of non-aromatic tertiary amines include N,N-dimethylaniline, triethylamine, tri-n-butyl amine, and mixed trialkylamines. Preferred liquid phase catalysts include pyridine and isoquinoline, optionally substituted with a polar group at one or more sites other than carbon atoms adjacent to the ring nitrogen. Suitable polar substituents include hydroxyl, hydroxyalkyl, acetamido, acetamido alkyl, acetyl, acetylalkyl, acetyloxy, acetyloxyalkyl, alkoxy, alkoxyalkyl, amino, alkylamino, and aminoalkyl groups. The catalyst can be dissolved in the solvent 22 and fed to the vessel 14 with the solvent 22, in an amount of about 0.01-2% by weight.

Control of the process of the invention is fairly straightforward. A first level indicator 60 regulates the minimum upper level of the solvent 22 in the upright vessel 14 and signals the need for more solvent if that level is breached. A second level indicator 62 regulates the maximum upper level of the elemental sulfur 46 in the lower conical portion 18 of the vessel 14. When that level is reached, the level indicator 62 signals the opening of discharge valve 50 for a period of time sufficient to empty most of the elemental sulfur 46 into the discharge container 52. The vertical distance between the first and second level indicators 60 and 62 represents the lowest height of the solvent 22 that serves as the reaction medium between the hydrogen sulfide and sulfur dioxide.

The chemical reaction suitably occurs under controlled temperature and pressure to facilitate substantial depletion of the hydrogen sulfide while generally maintaining the solvent 22 in a liquid phase. Suitably, the chemical reaction occurs at a temperature of at least about 70° C., or at least about 110° C., or about 110-150° C., or about 120-150° C. To achieve and maintain the desired reaction temperature, the solvent 22 can be circulated continuously or intermittently (as needed) through a loop 64 that includes a flow control valve 66, a recirculating pump 68, a heating/cooling device 70 and the feed nozzle 28 used for injecting sulfur dioxide into the solvent. The liquid solvent 22 is initially heated until the temperature gauge 72 monitoring the vessel 14 reads the desired temperature of solvent 22 in the vessel. Then, the chemical reaction is initiated by initiating the bubbling of hydrogen sulfide-containing gas 26 through the sparger 24 for interaction with the sulfur dioxide in the solvent, suitably in the presence of catalyst.

The chemical reaction between hydrogen sulfide and sulfur dioxide is exothermic. Depending on the surrounding environmental conditions, once the chemical reaction in the bubble tower reaches steady state, the liquid solvent 22 may need to be heated, or cooled, or neither, to maintain the temperature of the solvent 22 (measured by temperature gauge 72) in the vessel within the desired range of, for example, about 120-150° C. If either heating or cooling is required, then the temperature gauge 72 can signal the opening of flow control valve 66, the operation of circulating pump 68, and the heating or cooling (whichever is desired) by the heating/cooling device 70. For simplicity of illustration, the heating/cooling device 70 is shown as one unit. The same objectives can, of course, be accomplished using separate units for heating and cooling.

The chemical reaction in the vessel 14 can also be facilitated by applying pressure, as needed, to maintain the solvent 22 in a substantially liquid state at the desired temperature. Whether or not pressure is applied, and the amount of pressure needed, will depend on the vaporizing characteristics of the solvent at the desired reaction temperature. Diethylene glycol methyl ether has a boiling point of 202° C. at atmospheric pressure, which elevates at higher pressures. Because its boiling point is well above the desired reaction temperature, no significant pressure is required in the vessel 14 in order to maintain diethylene glycol methyl ether (or a similar high boiling solvent) in the liquid state when it is used as a solvent.

The hydrogen sulfide-containing gas 26 is typically stored under pressure and may have a source pressure of about 10 to about 80 atmospheres, for example. Some of this source pressure is advantageous because it enables the use of the flow control valve 40 to drive the hydrogen sulfide-containing gas through the sparger 24 and into the liquid solvent 22 in vessel 14 at any desired rate. The flow rate of hydrogen sulfide-containing gas should be low enough to ensure substantially complete reaction with sulfur dioxide in the liquid solvent 22, yet high enough to facilitate efficient operation. Depending on the flow rate of hydrogen sulfide-containing gas 26, the resulting hydrogen sulfide-depleted gas 54 in the vessel 14 above the liquid solvent 22 (as measured by pressure gauge 74) may have a slightly elevated pressure and/or there may be a pressure gradient from the top to the bottom of the vessel 14. Alternatively, the pressure in the vessel may be controlled to maintain a modest internal pressure of about 2-10 atmospheres, for instance.

Depending on whether the hydrogen sulfide-depleted gas 54 is a natural gas or an industrial tailgas, and the specific application, the hydrogen sulfide-depleted gas 54 should generally have a hydrogen sulfide content not exceeding about 100 ppm and a sulfur dioxide content not exceeding about 100 ppm. In some applications, the requirements may be much lower, on the order of about 0.01 to 1 ppm hydrogen sulfide gas and about 0.01 to 1 ppm sulfur dioxide. These requirements can be achieved by optimizing the solvent type and process conditions so that any unreacted sulfur dioxide remains substantially in solution, and by always providing a stoichiometric excess of sulfur dioxide that is sufficient to ensure a substantially complete reaction and depletion of the hydrogen sulfide. The hydrogen sulfide content in the incoming hydrogen sulfide-containing gas 26 is generally known or determinable, and typically ranges from about 1-5% by volume, but can be as low as 100 ppmv or as high as 10% by volume, or even higher. The sulfur dioxide content in the solvent 22 should be more than sufficient to react with whatever level of hydrogen sulfide is present in the incoming hydrogen sulfide-containing gas 26. Because the solvent 22 has a finite solubility for sulfur dioxide, the sulfur dioxide can be rapidly depleted at relatively large flow rates of hydrogen sulfide. When this occurs, the sulfur dioxide can be continuously or periodically added to the solvent so that there is always enough sulfur dioxide in the solvent 22 to react with and deplete the incoming hydrogen sulfide.

The flow of hydrogen sulfide-containing gas 26 through the solvent 22 would necessarily pick up an amount of sulfur dioxide from the solvent. In terms of molar percent, the amount would at most approximate the vapor pressure of pure sulfur dioxide multiplied by the concentration of sulfur dioxide in the liquid, divided by the total pressure, in appropriate units. Depending on the tolerance for sulfur dioxide in the vapor leaving the vessel, the gas could be rinsed with pure solvent which would return to the vessel, or preferably quenched with water, part of which would be collected and returned to the vessel and part of which would be vaporized into the gas stream and would be subsequently collected, which in either case would reduce the amount of sulfur dioxide contained in the gas. The amounts of water or other solvent so added would be removed and recovered as described below, provided the temperature in the vessel was sufficient to revaporize the liquid added which would then be condensed and recovered.

Additionally, the solvent has some volatility, albeit low. If the amount of solvent in the treated gas is unacceptable or desired to be recovered for economic, environmental or other reasons, the solvent can be recovered by either water wash, cooling followed by a knockout vessel with return of the solvent and or condensed water to the vessel, or by other solvent recovery means known to those skilled in the art.

Finally, depending on the application, the hydrogen sulfide-depleted gas 54 exiting the stack 58 may contain undesirable levels of solvent vapor and/or water vapor. This might occur if the exit gas is natural gas intended for home or industrial use, or if the exit gas is discharged industrial gas. The exit gas can easily be treated using known dehydration techniques to remove water vapor, and using other known techniques for recycling solvent back to the bubble tower 12.

The embodiments of the invention described herein are presently preferred. Various modifications and improvements can be made without departing from the scope of the invention. The scope of the invention is defined by the appended claims, and includes all changes that fall within the meaning and range of equivalents.

We claim:

1. A process for removing sulfur from a hydrogen sulfide-containing gas, comprising the steps of:
   providing a bubble tower including an upright vessel having an upper main body portion, a lower portion, a solvent feed nozzle for feeding liquid solvent to the upper main body portion, and a sparger for feeding gas below the solvent feed nozzle;
   injecting liquid solvent into the bubble tower through the solvent feed nozzle;
   injecting sulfur dioxide into the liquid solvent;
   injecting hydrogen sulfide-containing gas into the bubble tower through the sparger;
   bubbling the hydrogen sulfide-containing gas through the liquid solvent in the bubble tower; and
   chemically reacting the hydrogen sulfide gas with the sulfur dioxide in the liquid solvent to yield elemental sulfur and water.

2. The process of claim 1, wherein the upper main body portion is cylindrical.

3. The process of claim 2, wherein the lower portion is conical.

4. The process of claim 1, further comprising the step of recovering the elemental sulfur from the lower portion.

5. The process of claim 1, wherein the sulfur dioxide is injected into the liquid solvent before the liquid solvent enters the bubble tower.

6. The process of claim 1, wherein the sulfur dioxide is injected directly into the bubble tower.

7. The process of claim 1, further comprising the step of heating the solvent in the bubble tower to at least about 110° C. before injecting the hydrogen sulfide-containing gas.

8. The process of claim 1, further comprising the step of maintaining the solvent temperature between about 120° C. and 150° C. during the step of chemically reacting the hydrogen sulfide-containing gas with the sulfur dioxide.

9. The process of claim 1, wherein the step of injecting hydrogen sulfide-containing gas into the bubble tower through the sparger further comprises the step of distributing the hydrogen sulfide-containing gas substantially uniformly across a cross-section of the bubble tower.

10. The process of claim 1, further comprising the step of recovering hydrogen sulfide-depleted gas from the bubble tower.

11. A process for removing sulfur from a hydrogen sulfide-containing gas, comprising the steps of:

providing a solvent in a vessel;
injecting sulfur dioxide into the solvent;
bubbling a hydrogen sulfide-containing gas through the solvent, wherein bubbles of hydrogen sulfide-containing gas are distributed substantially uniformly across a cross-sectional area of the vessel;
chemically reacting the hydrogen sulfide with the sulfur dioxide in the solvent to yield water, elemental sulfur and hydrogen sulfide-depleted gas;
recovering the elemental sulfur from the vessel; and
recovering the hydrogen sulfide-depleted gas from the vessel.

12. The process of claim 11, wherein the solvent comprises dimethylene glycol methyl ether.

13. The process of claim 11, further comprising the step of providing a homogeneous catalyst in the solvent.

14. The process of claim 11, wherein the solvent comprises an organic solvent.

15. The process of claim 14, wherein the organic solvent is selected from the group consisting of diethylene glycol methyl ether, triethylene glycol methyl ether, triethylene glycol dimethyl ether, polyethylene glycol dimethyl ether, and combinations thereof.

16. The process of claim 11, further comprising the step of pressurizing the vessel to an internal pressure of about 2 to about 10 atmospheres.

17. The process of claim 11, wherein the hydrogen sulfide-containing gas is supplied at a pressure of about 10 to about 80 atmospheres.

18. The process of claim 11, wherein the vessel has an internal pressure gradient.

19. The process of claim 16, further comprising the step maintaining a temperature of the solvent between about 110° C. and about 150° C.

20. A process for removing sulfur from a hydrogen sulfide-containing gas, comprising the steps of:
providing a solvent in a bubble tower having a cylindrical upper main body portion and a conical lower portion;
injecting sulfur dioxide into the solvent;
bubbling hydrogen sulfide-containing gas into the solvent across a cross-sectional area of the bubble tower;
chemically reacting the hydrogen sulfide with the sulfur dioxide in the solvent to yield water, elemental sulfur and hydrogen sulfide-depleted gas;
removing the elemental sulfur from the lower portion of the bubble tower; and
removing the hydrogen sulfide-depleted gas from the upper main body portion of the bubble tower.

21. The process of claim 20, wherein the hydrogen sulfide-depleted gas comprises natural gas.

22. The process of claim 20, wherein the hydrogen sulfide-depleted gas comprises an industrial tailgas.

* * * * *